United States Patent
Straub et al.

(10) Patent No.: US 12,459,522 B2
(45) Date of Patent: Nov. 4, 2025

(54) MONITORING SYSTEM AND METHOD FOR MONITORING

(71) Applicant: Knorr-Bremse Systeme Fuer Nutzfahrzeuge GmbH, Munich (DE)

(72) Inventors: Kornel Straub, Pomáz (HU); Benjamin Erdrich, Freudenstadt (DE); Huba Nemeth, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 228 days.

(21) Appl. No.: 18/317,235

(22) Filed: May 15, 2023

(65) Prior Publication Data

US 2023/0382408 A1    Nov. 30, 2023

(30) Foreign Application Priority Data

May 30, 2022    (EP) ..................... 22176030

(51) Int. Cl.
*B60W 50/06* (2006.01)
*B60W 30/14* (2006.01)
(Continued)

(52) U.S. Cl.
CPC ............ *B60W 50/06* (2013.01); *B60W 30/14* (2013.01); *B60W 30/18036* (2013.01);
(Continued)

(58) Field of Classification Search
CPC .............. B60W 50/06; B60W 30/14; B60W 30/18036; B60W 30/18109; B60W 50/14;
(Continued)

(56) References Cited

U.S. PATENT DOCUMENTS

| | | | |
|---|---|---|---|
| 10,515,279 B2 | 12/2019 | Nix et al. | |
| 2018/0272963 A1* | 9/2018 | Meyhofer | ........... B60W 50/023 |
| 2021/0146944 A1 | 5/2021 | Kundu | |

FOREIGN PATENT DOCUMENTS

DE    102012108543 A1    3/2014

OTHER PUBLICATIONS

"Drive Labs: Tracking Objects With Surround Camera Vision" by Nefi Alarcon, Jun. 6, 2019; downloaded from https://developer.nvidia.com/blog/drive-labs-tracking-objects-with-surround-camera-vision/ (Year: 2019).*

(Continued)

*Primary Examiner* — Kito R Robinson
*Assistant Examiner* — Tanya C Sienko
(74) *Attorney, Agent, or Firm* — NORTON ROSE FULBRIGHT US LLP

(57) ABSTRACT

A monitoring system for an environment of a vehicle. The vehicle includes a group of sensors adapted to cover various regions of the environment. The monitoring system includes a receiving module, a classification module, and a processing module. The receiving module is adapted to obtain information about a driving task of the vehicle. The classification module is adapted to classify, based on the obtained information, the group of sensors in at least a first subset and a second subset. The processing module is adapted to process sensor data of the first subset with higher priority than sensor data from sensors from the second subset.

16 Claims, 4 Drawing Sheets

(51) Int. Cl.
*B60W 30/18* (2012.01)
*B60W 50/14* (2020.01)

(52) U.S. Cl.
CPC ...... *B60W 30/18109* (2013.01); *B60W 50/14* (2013.01); *B60W 2420/403* (2013.01); *B60W 2420/408* (2024.01); *B60W 2554/4026* (2020.02); *B60W 2554/4029* (2020.02)

(58) Field of Classification Search
CPC ..... B60W 2420/403; B60W 2420/408; B60W 2554/4026; B60W 2554/4029; G06V 20/58
See application file for complete search history.

(56) References Cited

OTHER PUBLICATIONS

Machine translation of DE102019217393, downloaded from IP.com Feb. 20, 2025 (Year: 2025).*

* cited by examiner

MONITORING SYSTEM AND METHOD FOR MONITORING

RELATED APPLICATION INFORMATION

The present application claims priority to and the benefit of European patent application no. 22 176 030.9, which was filed in Europe on May 30, 2022, the disclosure of which is incorporated herein by reference.

FIELD OF THE INVENTION

The present invention relates to a monitoring system and a method for monitoring an environment of a vehicle and, in particular, to a situational dependent processing of multiple image sensors.

BACKGROUND INFORMATION

The processing of sensor data such as images from cameras, lidars or radars is a computationally intensive task when many sensors shall be processed in parallel. This applies in particular if the processing shall be combined with a detection of objects or if other environmental features which may be of importance for a particular driving task of the vehicle. Vehicles need for the needed data processing significant computational resources to provide the driver with all needed information about the environment of the vehicle in real-time. Nowadays, the situation becomes even more difficult because more and more sensors are installed in the vehicle or various types and at different positions to improve the situational awareness by providing a high-quality surround coverage of the vehicle.

A surround monitoring system is discussed in U.S. Pat. No. 10,515,279 B2 which include exactly four cameras, wherein on each side of the vehicle exactly one camera is located to provide a detection of objects in front and rear zones of the vehicle and, in addition, to provide a bird's eye view.

However, in many situations such systems are not able to process the amount of [date] data in real-time while driving the vehicle in concrete, sometimes complex, traffic situations while maintaining a reliable detection of all relevant objects, in particular of vulnerable traffic participants.

Therefore, there is a demand for other monitoring systems that improve the situational awareness around a vehicle without the need to install new computational hardware on the vehicle.

SUMMARY OF THE INVENTION

At least some of above-mentioned problems are overcome by a monitoring system as described herein, and by a method for monitoring as described herein. The further embodiments described herein disclose further advantageous realizations of the subject matter of the main descriptions and/or exemplary embodiments as described herein.

The present invention relates to a monitoring system for an environment of a vehicle. The vehicle comprises a group of sensors adapted to cover various regions of the environment. The monitoring system includes a receiving module, a classification module, and a processing module. The receiving module is adapted to obtain information about a driving task of the vehicle. The classification module is adapted to classify, based on the obtained information, the group of sensors in at least a first subset and a second subset. The processing module is adapted to process sensor data of the first subset with higher priority than sensor data from sensors from the second subset.

It is understood that the classification may be a continuous task and can change during runtime of the monitoring system (e.g. when the driving task or other conditions or inputs change). Similarly, the number of subsets can be arbitrary. Dependent on the number of available sensors and the overall coverage area the classification can be done in three, four, five, . . . subsets.

The environment may be a 360° surrounding of the vehicle and may include a near region (e.g. closer than certain distance such as 3 or 5 meter) and/or a far region (above the certain distance). This environment is divided into the various regions such as front region, rear region, side regions, near region, far region, etc. It is understood that a group of sensors includes at least two sensors, whereas a subset includes one or more sensors. A given region may be covered by a single or more than one sensor, wherein the sensors may be of same or different type. By dividing the group of sensors in subsets and treating them differently, the monitoring system assigns a hierarchy to the sensors dependent on a given driving task, i.e. some are more important than other.

According to embodiments, the sensors of the group can be available already on the vehicle so that the monitoring system will access them only. However, according to further embodiments the sensors may be part of the monitoring system.

Optionally, the processing module includes a switching module configured to switch between the various sensors in the group of sensors dependent on its priority or its affiliation to a subset.

The vehicle may comprise at least one electronic control unit, ECU, configured to provide the information about the driving task. Then, optionally, the classification module is adapted to base the classification in subsets on at least one of the following parts included in information about the driving task:
- a moving state (e.g. forward moving, reverse moving, standstill, cornering),
- a speed of the vehicle (e.g. to switch between near and far region sensors),
- a braking actuation (a rear sensor may get a higher priority),
- a position of the vehicle (e.g. on a parking lot or on a road),
- driving in town or driving out of town (e.g. in town, side sensors may have a higher priority),
- being in the vicinity of a loading station or a loading dock,
- being on a regulated area (e.g. a fright facility, a port facility, on a ferry),
- a driver input (e.g. via human-machine-interface, HMI).

The driver input may be an explicit selection of the driver (to prioritize a particular region of coverage) or an actuation of a braking, steering, acceleration, gear shift, etc.

Optionally, the classification module or the processing module is adapted to perform at least one of the following:
- to provide a hierarchy for all sensors in the group of sensors and the processing module is adapted to process the sensors dependent on the hierarchy provided by the classification module,
- to schedule a processing of the sensor data from the second subsets with a lower frequency or in an interleaved manner while processing sensors data of the first subset continuously.

It is understood that a lower frequency also covers the case of zero frequency (i.e. no processing at all) and the affiliation to certain subsets may change in time.

Therefore, according to embodiments, all sensors can be assigned with a priority level dependent on the traffic situation or can be classified in a plurality of subsets, each being processed with a possibly different frequency. The classification module may thus be further adapted to classify the second subset into a plurality of subsets, wherein each subset may include only a single sensor and each subset may have a different priority level for processing the respective sensor data. For example, if the vehicle moves in the forward direction, a front sensor may have the highest priority, the side sensors have a lower priority and the rear-looking sensor may have the least priority. Selecting or classifying the sensors implies thus an assignment of a hierarchy of the sensors for the particular task.

Optionally, the processing module is further adapted to perform one or more of the following:
- to process sensor data of the first subset with a first refresh rate and sensor data of the second subset with a second refresh rate being smaller than the first refresh rate,
- to detect, based on the sensor data, objects (e.g. other participants, vehicles, pedestrians, obstructions) or environmental features (e.g. traffic lanes, traffic signs) within the environment of the vehicle,
- to track objects in the environment of the vehicle when moving relatively to the vehicle from one region of the environment covered by one sensor to another region covered by another sensor,
- to process only an adjustable number of sensors within a given time period.

The adjustable number may depend on a processing power or computational resources of the processing module or the utilized data processing machine. If the processing power is limited, only few or a single sensor shall be selected and the others may stall their image or may be operated with a much lower frequency (refresh rate).

The vehicle may further include an assistance system providing one or more of the following functions: an emergency braking function, a lane departure warning, adaptive cruise control, a collision warning, reversing assistance function, driver monitoring, ramp dock control, moving off information function (e.g. when the vehicle starts unintentionally to move), blind spot detection, or others. Then, optionally, the processing module is adapted to provide output data about the detected objects or the environmental features to the assistance system (e.g. to warn a driver about an imminent collision with at least one of the objects or a lane departure).

The sensors in the group may include at least one of the following types: one or more camera units, one or more radar units, one or more lidar units, one or more ultrasonic units or a combination thereof. Then, optionally, the processing module is configured to process sensor data dependent on the type of the sensor (e.g. for radar or lidar sensors more computational power, other sensors need less computational resources). When different types of sensors cover a given region, the classification or priority may also depend on external conditions such as weather (e.g. rain, snow, fog), light condition, day time, night time, etc.

Optionally, the classification module is adapted to cause a change in the classification (and thus in the priority) of sensors upon a change in the driving task (e.g. the motion changes) or upon a detection of a vulnerable road user, such as a pedestrian. For example, if a forward moving vehicle starts a cornering, the priority of sensors at the vehicle side of the cornering may be increased (assigned to the first subset) and the front sensor may be classified in the second subset (priority is lowered).

Further embodiments relate to a surround view system adapted to provide a continuous surround view around a vehicle. The surround view system comprising a group of sensors adapted to cover various regions of the environment, when installed at the vehicle. The surround view system includes a monitoring system as described before, wherein the monitoring system is adapted to utilize the sensors of the surround view system. In addition, the surround view system may also utilize some sensors already installed on the vehicle.

Further embodiments relate to a vehicle, especially a commercial long-haul vehicle, with a surround view as described before.

Further embodiments relate to a method for monitoring an environment of a vehicle. The vehicle comprising a group of sensors adapted to cover various regions of the environment. The method includes the steps of:
- obtaining information about a driving task of the vehicle;
- classifying, based on the obtained information, the group of sensors in at least a first subset and a second subset; and
- processing sensor data of the first subset with higher priority than sensor data from sensors from the second subset.

The step of obtaining the information about the driving task may include the step of receiving or retrieving the information from another device.

It is understood that all functions describe previously in conjunction with the monitoring system can be realized as additional method steps.

This method may also be implemented in software or a computer program product and the order of steps may not be important to achieve the desired effect. Embodiments of the present invention can, in particular, be implemented in any electronic control unit, ECU, of the vehicle or can be implemented by software or a software module in the ECU. Therefore, embodiment relate also to a computer readable storage device having a program code for performing the method, when the program code is executed on a processor.

Embodiments overcome problems of the conventional monitoring systems by intentionally excluding one or more sensors temporarily from the processing and by implementing a situational dependent processing of sensor data. Such data processing is advantageously especially for driving tasks that do not need a full environmental coverage, which is a typical situation. Therefore, some of the sensors can be treated with a lower priority while others will be primarily processed. For example, for some driving tasks only a coverage in front of the vehicle is relevant, while for other driving tasks only the rear coverage is important.

Therefore, embodiments are particularly advantageous for surround view systems that provide a complete coverage of the vehicle. According to embodiments, in such surround view systems sensor data are processed with different, situational dependent, priorities. In contrast to conventional systems that activate the reverse camera only when the reverse gear is engage, embodiments may provide coverage of different region (optionally a complete surround view) at all time, but at different refresh rates. In other words, images for some less important regions may be intentionally stalled or frozen for some time. However, images from the less important regions may still be provided.

Some examples of the systems and/or methods will be described in the following by way of examples only, and with respect to the accompanying figures.

DETAILED DESCRIPTION

Figure 1:
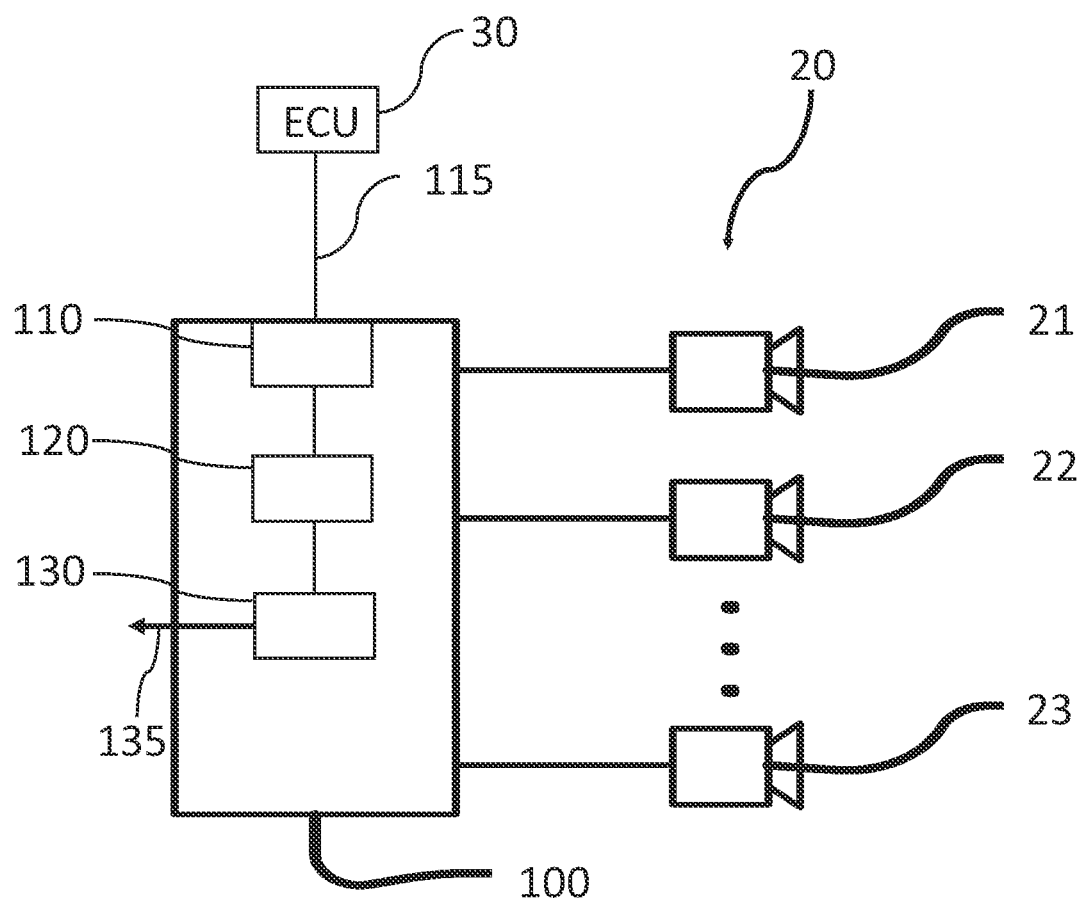
FIG. 1 depicts an embodiment for a monitoring system for an environment of a vehicle.

FIG. 1 depicts an embodiment for a monitoring system 100 for an environment of a vehicle (not shown in FIG. 1). The vehicle comprises a group of sensors 20 which are adapted to cover various regions of the environment of the vehicle. The system 100 includes a receiving module 110, a classification module 120, and a processing module 130. The receiving module 110 is adapted to obtain information 115 about a driving task of the vehicle. The classification module 120 is adapted to classify, based on the obtained information 115, the group of sensors 20 in at least a first subset 21 and a second subset 22, 23. The processing module 130 is adapted to process sensor data of the first subset 21 with higher priority than sensor data from sensors from the second subset 22, 23.

The receiving module 110 may obtain (e.g. receive or retrieve) the information 115 from any kind of data processing system or electronic control unit 30, ECU, or as storage device of the vehicle. The classification module 120 may thus create a hierarchy for the sensors 20, which is used by the processing module 130 to process the sensor data from the sensors 20 with different priorities. The result may be provided as output data 135 to the driver or another vehicle system (e.g. a display or any kind of assistance system).

According to embodiments, the classification module 120 as well as the processing module 130 (also the receiving module 110) can be implemented within one data processing unit (e.g. in an electronic control unit, ECU) of the vehicle. These modules 110, 120, 130 can partly or completely be implemented in (installed) software that enables the utilized data processing unit to provide the defined functions. The sensor data from the sensors 20 may be received or retrieved by the receiving module 110, but may also be transmitted directly to the processing module 130 where the processing of the sensor data is performed. Furthermore, the sensor data may be preprocessed by the sensors 20, which may include an object detection, filtering of data and other sensor specific pre-processing.

According to embodiments, a given sensor may belong for one driving task to the first subset 21 whereas for another driving task the same sensor may belong to the second subset 22, 23. The affiliation depends on the situation or the driving task. According to further embodiments the sensors 20 may also be part of the monitoring system 100, but this is not necessary. Sensors available on the vehicle may be utilized by the monitoring system 100.

According to embodiments, the classification module 120 selects one or more sensors that are relevant for the actual driving task to provide a necessary or an optimal environment coverage around the vehicle 10. It is understood that the selection might be discrete in that the available sensors are divided in subsets (i.e. classified), each of the subsets can be selected for a particular driving task. For example, sensors installed at the front side of the vehicle can be selected in a forward motion and sensors with a field of view in the rear direction can be selected in a reverse motion. It is also possible that all sensors are associated with a particular hierarchy for a given driving situation. For example, a forward motion can trigger a high priority for sensors installed at the front side of the vehicle, lower priority for sensors installed at the sides of the vehicle, and the least priority for sensors installed at the rear side of the vehicle. For a reverse motion, the hierarchy would be different. It is understood that the priority may also depend on external conditions such as light or visibility conditions, wherein the type of sensor may be selected accordingly.

According to embodiments, the number of selected sensors is less than the total number of sensors connected to the monitoring system 100 and less or equal to the number of sensors for which the processing module 130 is able to process sensor data in real-time. For example, for a complete surround coverage, at least four sensors may be needed, in which case the number of selected sensors is at the most three, but only one sensor or two sensors may be dependent on the driving task. For example, a single sensor can be selected by a straightforward motion and during a cornering situation at least two sensors can be selected with the same priority.

According to further embodiments the processing module 130 provides an object detection algorithm. The objects detection can be performed on the sensor data provided by the sensors 20. There may be a dedicated object detection per sensor, or a common object detection algorithm that can process sensor data from every sensor. For example, a dedicated object detection may be implemented with a lidar sensor which may provide sensor data as a point cloud. A different object detection may be used for radar devices or for optical images from cameras.

According to embodiments, the processing module 130 executes the object detection algorithm only on the sensor data received from the first subset 21 of sensors and provides the detected object. In addition, the processing module 130 may also detect other environmental features (for example traffic lanes or traffic signs) and provides the corresponding information for the devices and/or for algorithms to perform the current driving tasks. For example, when the driver has activated a lane following assist, the sensors 20 may forward the information about the lanes and a possible lane departure to the assistant device. Therefore, the output data 135 may include relevant information about detected objects and/or traffic lane information that can be shared with an emergency brake functionality or another warning device that warns the driver about an imminent collision (e.g. in front of the vehicle or on a side).

According to further embodiments, not only an object detection is carried out, but also further information may be derived. For example, the processing module 130 may be adapted to track an object relative to the vehicle 10 or to use this information to identify the object as another moving traffic participant or as an obstruction (for example a tree or building or a curb). For example, the object detection algorithm implemented in the processing module 130 or within at least some of the sensors may derive at least some of the following information:

dynamic object information about moving or movable objects, static object information such as traffic signs, traffic lights, bridges and other landmark information, lane and road boundary information.

According to further embodiments, an object detection can be carried out by the sensors 20 itself which may include a separate processing module that is able to detect objects based on the captured images. These detected objects can then be obtained by the monitoring system 100 and be tracked when processing sensor data from different sensors 20. However, the monitoring system 100 or the processing module 130 can additionally be configured to perform a separate object detection based on the obtained sensor data.

According to embodiments, the situationally dependent processing may be implemented in that the classification module 120 or the processing module 130 switch the processing between sensor data (or prep-processed data) from all connected sensors based on the information 115 indicating the driving task. Thus, embodiments may rely on a selecting or switching of the processing of input data between various sensors 20 based on the concrete situation (driving task 115). This switching is triggered by the classification module 120, but can also be controlled by the processing module 130.

Here and in the following the reference signs at the sensors 20 indicate the priority of the sensor and does not identify a given sensor. The sensor 21 will always be the sensor with the highest priority (belonging to the first subset 21), i.e. depending on the driving task this sensor may be the sensor mounted at the front or on the rear side.

Figure 2:
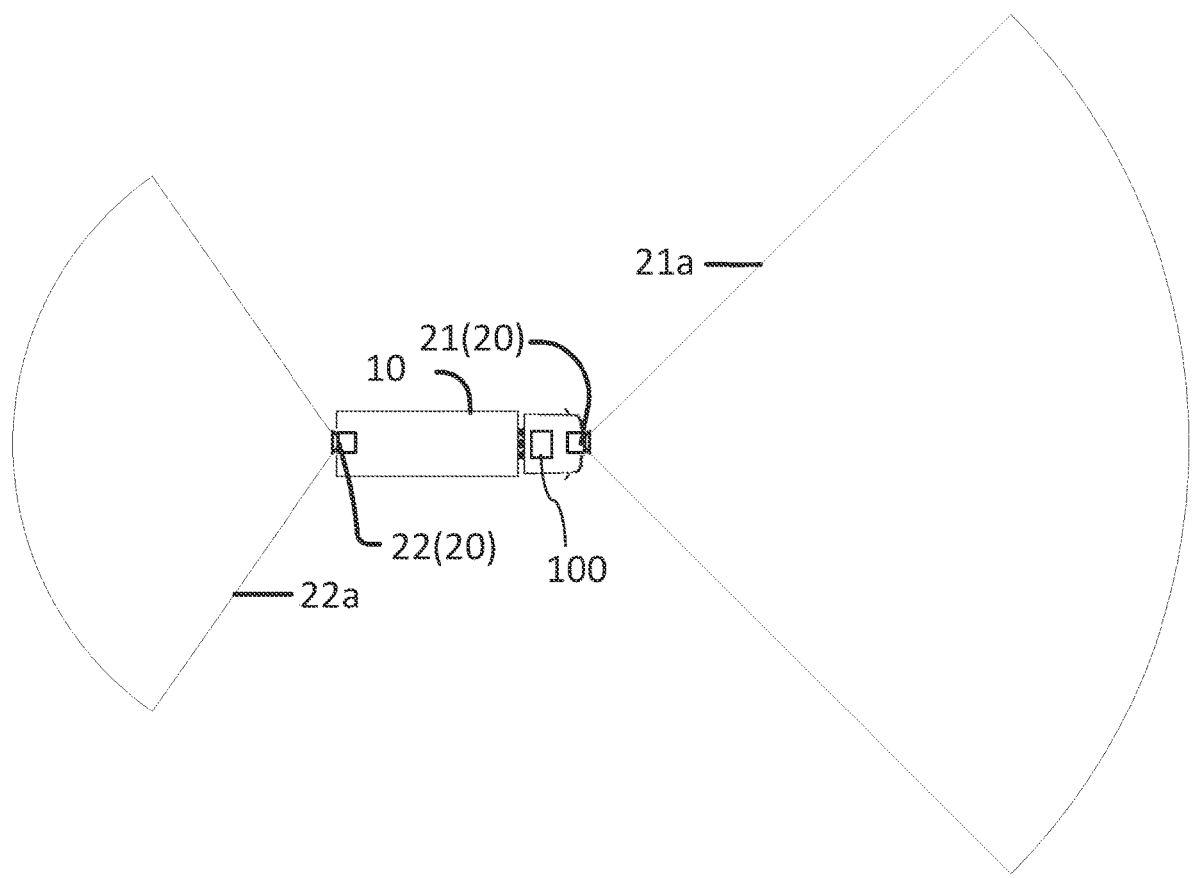
FIG. 2 illustrates a first exemplary arrangement of the sensors on the vehicle.

FIG. 2 illustrates a first exemplary arrangement of the sensors 20 on the vehicle 10. The vehicle is in particular a long-haul commercial vehicle with a tractor and a trailer, wherein the driver cannot see the region directly behind the trailer and has only a limited view on the sides. To improve the situational awareness for the driver for these vehicles various sensors 20 may be installed at different sides of the vehicle 10. For example, the vehicle 10 may include a first sensor 21 installed at the front side and a second sensor 22 installed at the rear side of a trailer. The first sensor 21 has a field of view 21a directed towards the front and the second sensor 22 has a field of view 22a towards the rear of the vehicle 10. The rear side of the trailer is only visible through the second sensor 22 installed at the rear side of the trailer.

In the depicted situation, the vehicle 10 is at standstill or moves in a forward direction. In these situations, the first sensor 21 at the front side may have the highest priority and will thus be associated with the first subset 21. The sensor 22 at the rear may be associated with the second subset 22.

However, even when the vehicle moves in the forward direction, the situation directly behind the trailer is not irrelevant, but may be less relevant for the driving task (moving forward). Therefore, according to embodiments, the monitoring system 100 will process sensor data from the first sensor 21 with a higher priority than sensor data from the second sensor 22 at the rear side of the trailer. This does not mean that the second sensor 22 is turned off (although it might be possible), but the frequency of image processing captured by the first sensor 21 may be higher than the frequency of processing of captured images by the second sensor 22. However, a traffic participant approaching from the rear may still be detected.

For example, the processing module 130 may process images from the first sensor 21 with a rate of 30 frames per second while images from the second sensor 22 may be processed with a rate of 3 to 10 frames per second. According to embodiments, the frame rate of image processing can be adjusted according to the affiliation to a subset.

According to further embodiments, not only two, but more than two sensors are connected to the monitoring system 100. However, also in this case, the processing module 130 might process at a given time only fewer sensors than there are connected to the processing module 130. For example, the processing module 130 may process only the front camera 21 or only the rear camera 22 at a given time period. Additionally or alternatively, as mentioned above, all or some sensors 20 can be processed with different frame rates or refresh rates according to the assigned priority.

According to embodiments, the receiving module 110 receives information 115 about the actual driving task either from an external device 30 or from a built-in algorithm. An external device 30 may be an electronic control unit installed on the vehicle 10 which provides the information 115 (e.g. via the vehicle bus system; see FIG. 1) and, based thereon, the monitoring system 100 can determine the current driving task or a future driving task. The built-in algorithm may detect by itself the driving situation such as a moving of the vehicle in a forward or a reverse direction or may detect the speed or a braking situation of the vehicle 10 or whether the vehicle intends to make a cornering to the right side or left side in which case the relevant sensors for these motion states can be activated. This may be done by utilizing an acceleration sensor (e.g. an IMU, inertial measurement unit). For this, optionally, the monitoring system 100 may obtain respective information (e.g. a speed, a steering angle) from other vehicle components (e.g. the IMU).

Figure 3:
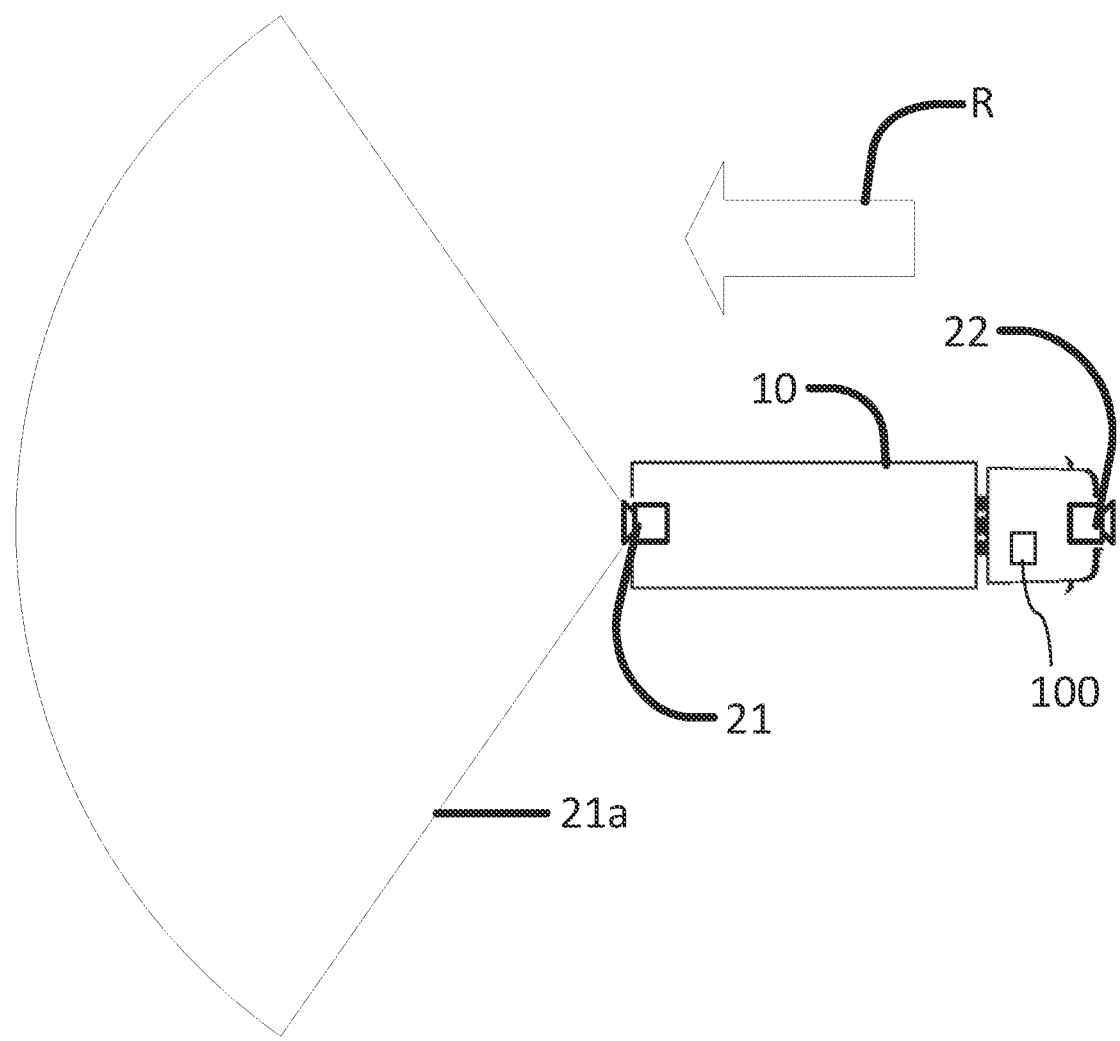
FIG. 3 illustrates an exemplary traffic situation, where the vehicle shall move in the backward direction.

FIG. 3 illustrates an exemplary traffic situation, where the vehicle 10 shall move in the backward direction R. This driving task may be indicated by engaging the reverse gear or be detecting a reverse speed (e.g. from a wheel speed sensor) and the respective information 115 can be received by the receiving module 110. According to embodiments, for this driving task the sensors 20 are assigned with different priorities (when compared to FIG. 2). The sensor at rear side of vehicle 10 will now be assigned to the first subset 21, whereas the sensor at the front side will be assigned to the second subset 22. The change in the reference signs in FIG. 2 and FIG. 3 indicate the different prioritization of the sensors 20.

In particular, when the vehicle 10 is moving backward as in FIG. 3, the data processing of sensor data from the sensor 22 at the front side may be turned off completely and only sensor data from the sensor 21 at rear side will be processed to enable a coverage of the region behind the trailer which is in the field of view 21a of the sensor 21 at the rear side of the trailer.

Alternatively, or additionally, at least some of the side sensors (not depicted in FIG. 3) can be processed or selected by the monitoring system 100 so that the driver can keep track of objects which are not only located at the rear side of the vehicle 10 but also on the left-hand side and on the right-hand side of the vehicle 10. This will provide the driver with a reliable surrounding view of the vehicle 10. For example, according to one embodiment, if the vehicle 10 switches to the backwards motion, the classification module 120 could switch to the rear camera 21 to receive input data from the second sensor 21.

According to embodiments, relevant information such as objects and/or lane information can again be shared with an assisting function of the vehicle such as the reverse assist (or emergency braking assist) that supports the driver when approaching a ramp-dock or warns the driver in case a pedestrian or another vulnerable road user is present in the blind spot behind the vehicle 10.

According to embodiments, the sensors 20 can be any device that is able to provide information to the driver about the surrounding of the vehicle 10. In particular, the sensors 20 may be or include: a camera, a radar sensor, lidar sensor, ultrasonic sensor, or any combination thereof. Accordingly, the sensor data will differ. For example, a lidar may provide point cloud imaging which may need a lot of processing power in order to obtain the relevant object information in the environment of the vehicle 10. Therefore, the prioritization can be performed not only with respect to a driving direction, but also with respect to external condition (weather condition, day, night, etc.).

According to further embodiments, alternative or additional sensors or sensors of different type can be installed (e.g. on mirrors which look downward or rearward or inside the cabin to provide a monitoring). Other additional sensors may be far range (e.g. more than a predetermined distance such as 5 m or 3 m) or near range sensors (below the predetermined distance). All these sensors, which are not shown in FIG. 3, may be processed with the same or lower/higher priority compared to the sensors 21, 22 at the rear/front side of the vehicle 10.

It is understood that the concrete mounting position is less relevant but the field of view of the sensor may be important for the priority of the respective sensor. For example, rear-looking sensors may also be installed on a side of the vehicle or on mirrors or underneath the trailer. According to embodiments, a switch may again be utilized to switch between sensors on the left-sided and right-sided sensors or between far range sensors and near range or downwards looking sensors. Similarly, switches can be utilized according to embodiments to switch between sensors inside the vehicle cabin and outside the vehicle cabin like a driver monitoring camera and a rear camera.

Figure 4:
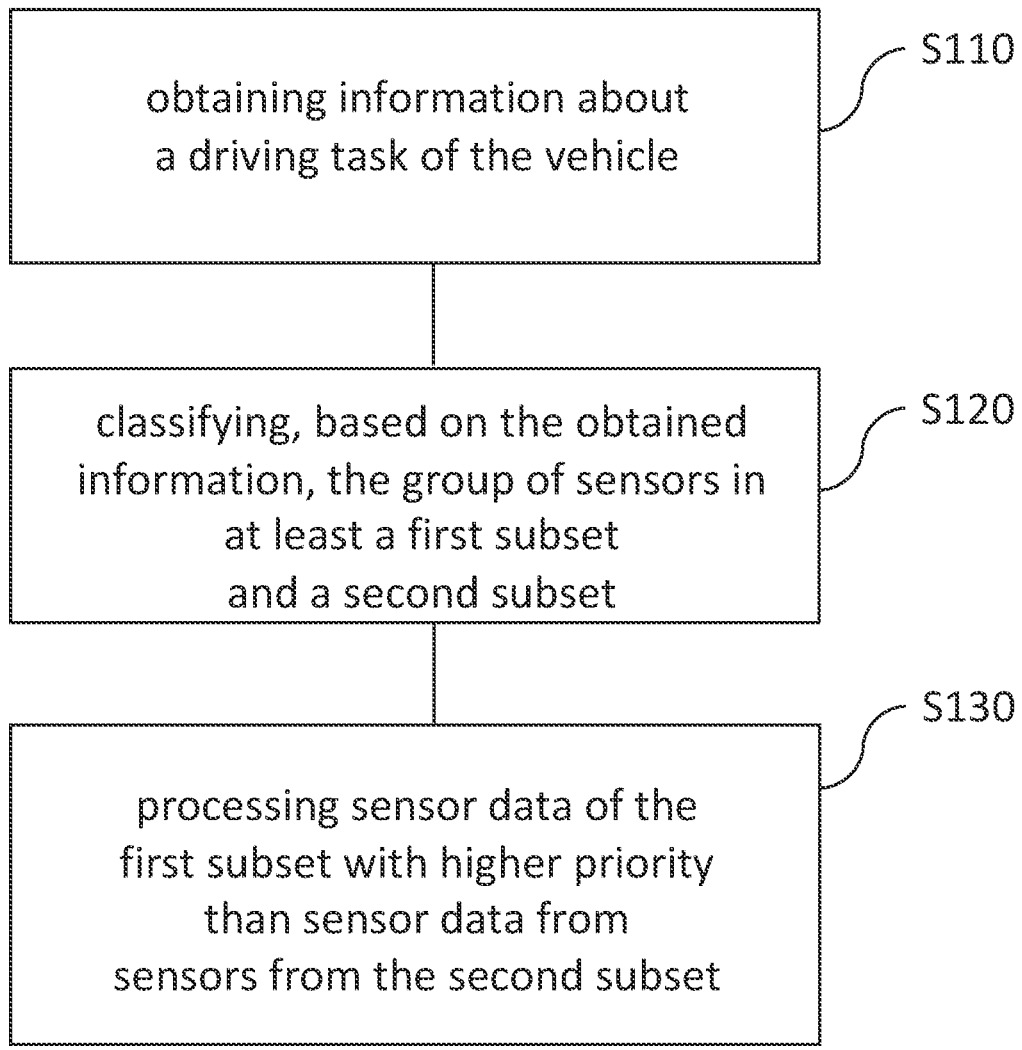
FIG. 4 depicts a schematic flow diagram of a method for an environment of a vehicle.

FIG. 4 depicts a schematic flow chart of a method for monitoring an environment of a vehicle comprising a group of sensors adapted to cover various regions of the environment. The method includes the steps:
  obtaining (S110) information (115) about a driving task of the vehicle (10);
  classifying (S120), based on the obtained information (115), the group of sensors (20) in at least a first subset (21) and a second subset (22); and
  processing (S130) sensor data of the first subset (21) with higher priority than sensor data from sensors from the second subset (22).

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

Embodiments provide the following advantages:

A particular advantage of embodiments relates to the fact that more sensors can be connected and processed on a given processing module 130 which is intended to process input data of only one sensor. Therefore, the processing module 130 does not need to be a high-end processing module for providing a complete surround monitoring. Even older processing modules that are already installed on the vehicle 10 can therefore be upgraded to process data for a surround view system which they otherwise could not handle.

Furthermore, a reliable and sufficient surround coverage can be ensured, because there is no need to process all images from all sensors at all times. If all images would be processed in parallel, the processing would need more processing power and a more powerful processing module to ensure an in-time processing which is more expensive and would often lead to installing new computational hardware to ensure the desired surround coverage.

Therefore, embodiments can be installed on systems with only limited resources, e.g. which are able to process images from only one sensor in real-time. Also such systems can be used to process the input data of one or more sensors selected from multiple connected sensors based on the actual driving situation or the driving task.

Furthermore, embodiments can be extended towards higher processing capabilities with even more sensors.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

THE LIST OF REFERENCE SIGNS IS AS FOLLOWS

10 vehicle (e.g. long-haul commercial vehicle)
20 group of sensors
21, 22, 23 subsets of sensors (at least one sensor)
21a, 22a field of view of the sensor(s)
30 electronic control unit or storage device
100 monitoring system
110 receiving module
115 information about a driving task
120 classification module
130 processing module
135 output data

What is claimed is:

1. A monitoring system for an environment of a vehicle, the vehicle including a group of sensors adapted to cover various regions of the environment, comprising:
  at least one electronic control unit; and
  a non-transitory computer readable storage medium on which program code is stored, the program code, when executed by the electronic control unit, causing at least one of the at least one electronic control unit to perform the following steps:
    obtaining information about a driving task of the vehicle,
    classifying, based on the obtained information, the group of sensors into at least a first subset and a second subset so at to divide the group of sensors into subsets including the at least the first and second subsets, and
    processing sensor data from the sensors of the first subset with higher priority than sensor data from the sensors of the second subset, wherein the sensor data from the sensors of the first data set and the sensor data from the sensor data of the second data set are processed during the processing, and wherein (i) the sensor data from the sensors of the second subset are processed at a lower frequency than a frequency at which the sensor data of the sensors of the first subset are processed, or (ii) the sensor data from the sensors of the second subset are processed in an interleaved manner while the sensor data of the sensors from the sensors of the first subset are processed continuously.

2. The monitoring system of claim 1, wherein the sensor data from the sensors of the second subset are processed at the lower frequency which is lower than the frequency at which the sensor data of the sensors of the first subset are processed.

3. The monitoring system of claim 1, wherein the sensor data from the sensors of the second subset are processed in the interleaved manner while the sensor data of the sensors from the sensors of the first subset are processed continuously.

4. A surround view system to provide a continuous surround view around a vehicle, comprising:
a group of sensors adapted to cover various regions of an environment around the vehicle, when installed at the vehicle; and
a monitoring system for the environment of the vehicle, including:
at least one electronic control unit, and
a non-transitory computer readable storage medium on which program code is stored, the program code, when executed by the electronic control unit, causing at least one of the at least one electronic control unit to perform the following steps:
obtaining information about a driving task of the vehicle,
classifying, based on the obtained information, the group of sensors into at least a first subset and a second subset so at to divide the group of sensors into subsets including the at least first and second subsets, and
processing sensor data from the sensors of the first subset with higher priority than sensor data from sensors of the second subset;
wherein the monitoring system is adapted to utilize the sensors of the surround view system;
wherein the sensor data from the sensors of the first data set and the sensor data from the sensor data of the second data set are processed during the processing, and wherein (i) the sensor data from the sensors of the second subset are processed at a lower frequency than a frequency at which the sensor data of the sensors of the first subset are processed, or (ii) the sensor data from the sensors of the second subset are processed in an interleaved manner while the sensor data of the sensors from the sensors of the first subset are processed continuously.

5. A vehicle or a commercial long-haul vehicle, comprising:
a surround view system to provide a continuous surround view around a vehicle, including:
a group of sensors adapted to cover various regions of an environment around the vehicle, when installed at the vehicle; and
a monitoring system for the environment of the vehicle, including:
at least one electronic control unit, and
a non-transitory computer readable storage medium on which program code is stored, the program code, when executed by the electronic control unit, causing at least one of the at least one electronic control unit to perform the following steps:
obtaining information about a driving task of the vehicle,
classifying, based on the obtained information, the group of sensors into at least a first subset and a second subset so as to divide the group of sensors into subsets including the at least the first and second subsets, and
processing sensor data from the sensors of the first subset with higher priority than sensor data from the sensors of the second subset;
wherein the sensor data from the sensors of the first data set and the sensor data from the sensor data of the second data set are processed during the processing, and wherein (i) the sensor data from the sensors of the second subset are processed at a lower frequency than a frequency at which the sensor data of the sensors of the first subset are processed, or (ii) the sensor data from the sensors of the second subset are processed in an interleaved manner while the sensor data of the sensors from the sensors of the first subset are processed continuously,
wherein the monitoring system is adapted to utilize the sensors of the surround view system.

6. A method for monitoring an environment of a vehicle, the vehicle including a group of sensors adapted to cover various regions of the environment, the method comprising:
obtaining information about a driving task of the vehicle;
classifying, based on the obtained information, the group of sensors into at least a first subset and a second subset, so as to divide the group of sensors into subsets including the at least the first and second subsets; and
processing sensor data from the sensors of the first subset with higher priority than sensor data from the sensors of the second subset;
wherein the sensor data from the sensors of the first data set and the sensor data from the sensor data of the second data set are processed during the processing, and wherein (i) the sensor data from the sensors of the second subset are processed at a lower frequency than a frequency at which the sensor data of the sensors of the first subset are processed, or (ii) the sensor data from the sensors of the second subset are processed in an interleaved manner while the sensor data of the sensors from the sensors of the first subset are processed continuously.

7. The method of claim 6, further comprising:
switching between the sensors in the group of sensors for processing respective sensor data of the sensors dependent on each sensor's affiliation to a subset of the at least first and second subsets.

8. The method of claim 6, further comprising:
receiving, from at least one of the at least one electronic control unit, the information about the driving task, wherein the classification module is adapted to base the classification into the subsets on at least one of the following parts included in information about the driving task:
a moving state,
a speed of the vehicle, a braking actuation,
a position of the vehicle,
driving in town or driving out of town,
being in the vicinity of a loading station or a loading dock,
being on a regulated area, and/or
a driver input.

9. The method of claim 6, further comprising:
providing a hierarchy for all sensors in the group of sensors, and
processing the sensor data dependent on the hierarchy provided.

10. The method of claim 6, further comprising:
processing the sensor data from the sensors of the first subset at a first refresh rate and processing the sensor data from the sensors of the second subset at a second refresh rate, the second refresh rate being smaller than the first refresh rate.

11. The method of claim 6, wherein the vehicle includes an assistance system, the assistance system providing at least one the following: an emergency braking function, a lane departure warning, adaptive cruise control, a collision warning, reversing assist function, driver monitoring, ramp dock control, moving off information, and/or blind spot detection, and wherein the method further comprises:
detecting, based on the sensor data from the sensors of the first subset and/or the sensor data from the sensors of the second subset, objects or environmental features within the environment of the vehicle; and
outputting data about the detected objects or the environmental features to the assistance system.

12. The method of claim 6, wherein the sensors include at least one of the following types: one or more camera units, one or more radar units, one or more lidar units, one or more ultrasonic units or a combination thereof, and wherein the processing of the sensor data from the sensors of the first subset and the processing of the sensor data from the sensors of the second subset are dependent on the type of the sensor.

13. The method of claim 6, further comprising:
causing a change in the classification of the sensors upon a change in the driving task or upon a detection of a vulnerable road user, including a pedestrian or a cyclist.

14. The method of claim 6, wherein the sensor data from the sensors of the second subset are processed at the lower frequency which is lower than the frequency at which the sensor data of the sensors of the first subset are processed.

15. The method of claim 6, wherein the sensor data from the sensors of the second subset are processed in the interleaved manner while the sensor data of the sensors from the sensors of the first subset are processed continuously.

16. A non-transitory computer readable storage medium having a computer program, which is executable by a processor or a control unit, comprising:
a program code arrangement having program code for monitoring an environment of a vehicle, the vehicle including a group of sensors adapted to cover various regions of the environment, by performing the following:
obtaining information about a driving task of the vehicle;
classifying, based on the obtained information, the group of sensors into at least a first subset and a second subset, so as to divide the group of sensors into subsets including the at least the first and second subsets; and
processing sensor data from the sensors of the first subset with higher priority than sensor data from the sensors of the second subset;
wherein the sensor data from the sensors of the first data set and the sensor data from the sensor data of the second data set are processed during the processing, and wherein (i) the sensor data from the sensors of the second subset are processed at a lower frequency than a frequency at which the sensor data of the sensors of the first subset are processed, or (ii) the sensor data from the sensors of the second subset are processed in an interleaved manner while the sensor data of the sensors from the sensors of the first subset are processed continuously.

\* \* \* \* \*